Aug. 10, 1943.   D. W. YOUNG ET AL   2,326,595
SIZE REDUCTION AND STABILIZATION OF OIL THICKENING POLYMERS
Filed Jan. 1, 1942

David W. Young, Inventors
Charles C. Swoope
By P. L. Young, Attorney

Patented Aug. 10, 1943

2,326,595

UNITED STATES PATENT OFFICE 2,326,595

SIZE REDUCTION AND STABILIZATION OF OIL THICKENING POLYMERS

David W. Young, Roselle, and Charles C. Swoope, Union, N. J., assignors, by mesne assignments, to Jasco, Incorporated, a corporation of Louisiana Application January 1, 1942, Serial No. 425,290

5 Claims. (Cl. 260—32)

This invention relates to a method of treating linear polymers having wide variations in molecular dimensions to make the polymers more uniform in size, improve their stability, and make blends of the polymers more homogeneous.

Some organic compounds are capable of polymerizing into long chain polymeric molecules having molecular weights above 1000. Among these are styrene, acrylic esters, vinyl esters, iso-olefins, and diolefins. The polymerization products are composed of mixtures of polymers substantially homologous in composition but widely varying in molecular weights.

Certain linear polymers meet requirements of solubility in petroleum oils, resistance to oxidation, resistance to thermal decomposition under severe lubrication conditions, and effectiveness in low concentrations for thickening oils with a beneficial lowering in the viscosity-temperature coefficient of the oils to be useful commercially for improving the viscosity characteristics of the oils. These linear polymers may be regarded as being fusible, thermoplastic resins. However, the variations in the size of the polymers as they are formed create the problem of making the polymers more uniformly of a desired molecular weight range in order to enhance their blending characteristics and their stability in the blended compositions.

In past efforts for making the linear polymers more uniform in molecule size and improving their stability, mechanical melting and heat depolymerization treatments were investigated. The heat depolymerization has limitations in requiring great accuracy of control and in causing darkening of color, while the milling operations practiced required large power consumption and were difficult to carry out on a large scale in that they depended on forcing the polymers through extremely small clearances as, for example, forcing the polymers through capillaries having a radius of 0.01 cm., or less, or between surfaces having similar extremely small clearances.

The present invention has the object of providing a method of selectively reducing the size of abnormally high molecular weight linear polymers to within a desired molecular weight range in mixtures of a polymer for enhancing stability and blending characteristics of the polymers with improved efficiency and with considerably greater capacity.

To break down the unstable polymers of excessively high molecular weight in accordance with the present invention, instead of using a colloid mill in which the polymers are forced through passages of extremely minute clearance dimensions and in sharp distinction thereto, it is preferred to use a kind of apparatus wherein the polymers are made to flow freely through relatively larger channels and are subjected to hydraulic and impact stresses rather than to attrition in extremely narrow clearances, and further to increase the effectiveness of the machine, to have air or gaseous oxygen absorbed in the polymer material being treated.

The method for accomplishing the objects of the present invention and further objects thereof will be understood from the following description.

The preferred type of apparatus for use in the practice of the present invention is shown in the accompanying drawing.

Figure 2:
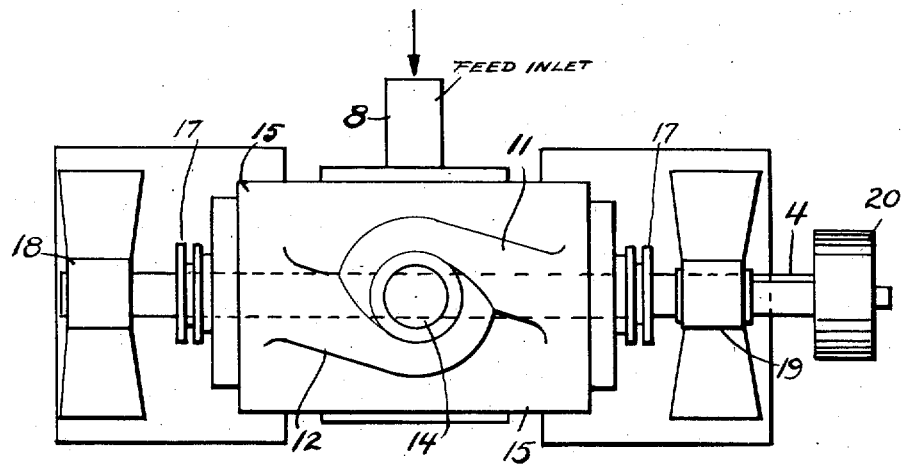
Fig. 2 shows a plan view of the polymer size-reducing apparatus.
Figure 1:
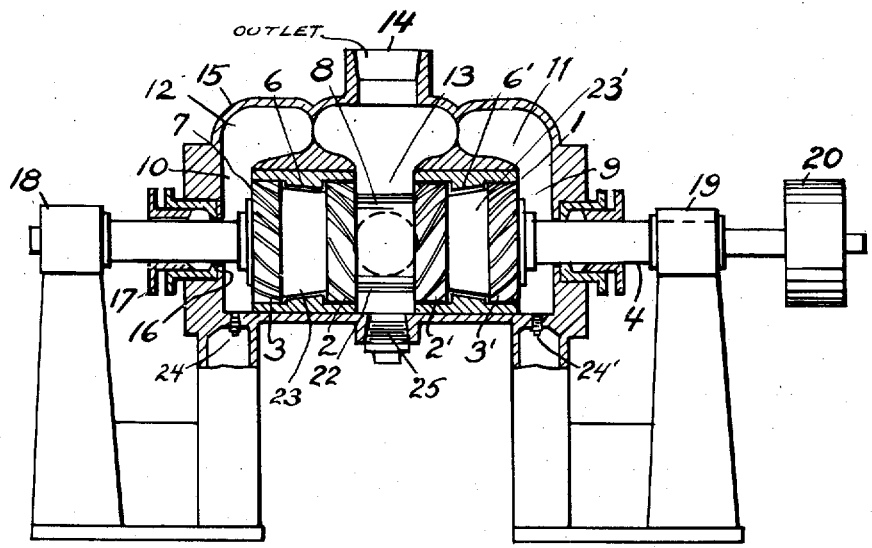
Fig. 1 shows an elevational view of the apparatus with parts in cross section.

Referring to the drawing, the polymer size-reducing apparatus has a horizontal operating tube 1 with duplicate sets of two impellers 2, 3, 2', and 3' attached to a rotating shaft 4 and a set of stator vanes 6 and 6' fixed to the tube wall between the two impellers of each set. The impellers have peripheral spaced blades 7, the blades of one set of impellers facing in a direction opposite to that of the other set. The radial length of the impeller blades is small so that all the material processed is confined to a thin annular ring where it is subjected to a high peripheral velocity of the rotating blades into a whirling motion or vortical flow.

When operating, the machine is entirely filled with the liquid polymer-containing material fed in from the inlet 8 at a suitable point between the stator vanes. The inner impellers 2 and 2' force the material to flow outwardly towards the ends of the operating tube 1 and up the end passages 9 and 10 to the top channels 11 and 12. The streams of material enter the central portion of the top channel tangentially causing them to be mixed intimately as a portion or all of the material is returned down the vertical passage 13 to the middle of the operating tube for re-entry into the inner impeller blades and recirculation. Thus new feed may be added at any point in the recirculating stream, and the finished product, at least equal in amount to the new feed, is discharged from the center of the top channel through outlet 14, this material having been passed at least one time through a set of impellers and intermediate stator vanes. The operating tube and stream recirculating channels are encased by a housing 15. The rotating shaft 4 which passes centrally through the operating tube extends outwardly through assemblies of a seal ring 16 and a packing gland 17 to retain the fluid material within the machine. One end of the shaft is supported by a bearing 18. The other end of the shaft is supported by bearing 19 and extends therethrough to a driving device 26 so that it may be revolved by any suitable power. The machine may be cleaned by removal of drain plugs 24, 24', and 25 at the bottom of the housing.

The shaft is run usually at a speed of 3600 revolutions per minute. Due to the free circulation provision, the capacity of the machine varies with the rate of feed processed and is determined by the rate of flow through the operating tube. The operation of the machine is not dependent upon close working clearances between moving parts, between moving and stationary parts, or stationary parts. The limit of capacity may be said to be reached when the rate of feed equals the total flow through the operating tube and when recirculation ceases.

Mounted on the shaft 4 between the inner impellers is a cylindrical collar 22 of sufficiently restricted diameter to permit the liquid to flow readily into the impeller blades around the entire circumference of the collar. Between the inner and outer impellers of each set, conical collars 23 and 23' are mounted on the shaft, and the lateral surface of these collars are nearly in contact with the edges of the stator vanes.

The stator vanes define a plurality of narrow passages extending axially of the operating tube, and it is through these passages that the material is impelled to flow. The collars reduce the working space in the tube so that the fluid material passing thru the tube assumes the form of a thin annular stream into which the ends of the impeller blades project.

When the material is passed through the operating tube, it first has a form of a thin annular stream circulating in a vortical manner. While the particles of the material are being thrown outwardly by centrifugal action, the blades in a spiral alignment also throw the particles toward the stator vanes and into the passages between the stator vanes, the shaft being revolved counterclockwise as viewed from the driven end. On entering these passages between the stator vanes, the material is subjected abruptly to a change in direction, the whirling motion being converted into a rectilinear movement. In flowing thru the passages between the stator vanes, the thin annular stream becomes divided into a number of narrower streams. When the narrower streams emerge from the stator vanes, their rectilinear motion is again abruptly changed by the outer impellers into a whirling motion.

In the circulation of the material thru the operating tube, there is sufficient space provided at all places to obtain a good rate of flow, for example, the clearances between parts which define the streams of the circulating material as it flows thru the impeller blades and thru the passages between the stator vanes may be of the magnitude of one fourth of an inch or more.

With the mechanism described, the polymer material is first subjected by the impeller blades to whirling motion and is rotated into a high degree of turbulency, being at the same time forced in the direction of the spaced stationary vanes set so as to abruptly change the direction of the turbulent stream and convert the whirling motion into rectilinear flow, and this action is repeated in the reverse direction when the stream emerges from the stationary vanes into the outside impeller. In this operation, the polymer material becomes subjected to hydraulic shearing and impact forces, the impeller blades giving the material a high speed operating against the resistance due to the inertia of the liquid being processed.

In contrast to the very low flow rates of only about 10 g./minute to 60 g./minute in a capillary tube or colloid mill, a machine of the type described has a considerably higher capacity and may be constructed at a low cost in units having capacities as high as 500 gals./hour.

As already mentioned, the instability of the linear thickening polymers in oil blends has been found to be due to the presence of small amount of polymers having abnormally high molecular weights. The abnormally high molecular weight polymers have a high thickening potency and may give the blend greater stringiness than is required, but after the oil blend containing the thickening polymers has been subjected to operating conditions as in lubrication, the viscosity characteristics of the oil become considerably changed due to the breakdown of the unstable polymers. This phenomenon has been studied mainly in the application of isobutylene thickening polymers known as polybutenes, which have apparent molecular weights as determined by the Staudinger method (Der. Aufbau der Hochmolekularen Org. Verbindungen, C. A. 26, 3513) ranging from about 3,000 to as high as about 120,000.

Viscosity data have shown that the instability of isobutylene polymer products can be overcome very effectively by pretreating the raw polymerization product in the apparatus described on a commercial scale. Following the procedure described, a sample of polybutene having an average molecular weight of the order of 15,800 blended with a mineral lubricating oil having a viscosity of 47 Saybolt seconds at 210° F. was processed. The results of this processing listed in the following table indicate that the apparatus was capable of giving the desired increased stability to the polymer in the blend with excellent throughput.

*Table I*

| | Viscosity, furol at 210° F. | Mol. wt. of polymer | Treatment temperature °F. | Flow rate Gal./min., approx. |
|---|---|---|---|---|
| Raw polymer | 685 | 15,800 | | |
| Treated polymer | 566 | 13,800 | 125 | 1 |

For the sake of comparison, stability tests were made on a number of polymer blends. In one set of samples, the polymers were subjected to attrition in a colloid mill. Another set of the polymer samples was subjected to selective breakdown thru the action of hydraulic and impact stresses in the machine described, by which the oil solution of the polymer was rapidly rotated into vertical motion and then abruptly given a rectilinear motion and again whirled into a vertical motion. To make the test comparative, samples of the same raw isobutylene polymer product having an average molecular weight of 15,800 was used to prepare the blends that were treated. Samples of each set were subjected to various degrees of treatment and the blends before and after the treatments were analyzed for molecular weight of the polymer and were subjected to a pressure viscosimeter test for stability, this test being in close agreement on the extent of breakdown suffered by the polymer when an oil blend of the polymer is used for 17 hours in a C. F. R. internal combustion engine.

Summarized data on the results are shown in the following table:

*Table II*

| Treatment | Average molecular weight | Pressure viscosity breakdown test decrease in vis. Saybolt Univ. secs. @— | |
|---|---|---|---|
| | | 100° F. | 210° F. |
| None | 15,800 | 16.8 | 2.21 |
| Colloid mill | 15,000 | 12.0 | 2.09 |
| Do | 14,200 | 11.3 | 1.65 |
| Do | 13,400 | 6.0 | 1.08 |
| Described machine | 15,000 | 10.2 | 2.00 |
| Do | 14,700 | 8.3 | 1.60 |
| Do | 14,200 | 5.6 | 1.07 |

The stability tests shown in the above table were performed on blends of the polymers in samples of the same base lubricating oil and in each test the oil blend was made up to have substantially the same initial viscosities at 100° F. and at 210° F. The data gives a picture of how the preferred high capacity mechanism selectively breaks down the unstable polymers, so that when the treated polymers are blended and used in a lubricating oil blend, they undergo much less breakdown even though the polymers retain a higher average molecular weight than when the polymers are subjected to the much slower and greater power consuming colloid mill treatment. It is to be noted, for example, how the highly milled polymer of 13,400 average molecular weight is more unstable than the polymer of 14,200 average molecular weight derived from the same initial polymer by treatment in the preferred machine.

A further study was made of the effect of air or oxygen on the breakdown of the isobutylene polymers in oil. In these tests, air was passed into mineral oil solutions of the polymers until the mixture had a consistency of a foam. The effect of admixing the air can be visualized to some extent by the observation that bubbles of considerable size, i. e., having diameters up to as high as about 8 inches, were formed when air was led into the oil solution at a rate of 2 cu. ft./hour. The oil solutions of the polymers containing the air were then fed into the described machine.

Tests indicated that the polymer blends containing admixed air were changed in viscosity and improved in stability more rapidly than the blends containing no added air treated in the same machine. Also, tests made indicated that the polymer blends containing admixed carbon dioxide were changed in viscosity and improved in stability the same as the blends containing no added air treated in the same machine. These data indicated that air or oxygen is a catalyst for breakdown in this test machine. To demonstrate these effects, the following examples are presented:

The oil solution samples used were blends containing about 6% of isobutylene polymers having molecular weights in the range of 50,000 to 120,000. These polymers were blended with a petroleum lubricating oil having a viscosity index of 45 and a Saybolt Universal of 45 seconds at 210° F. Results of comparative runs are as follows:

| Material treated | Vol. of solution treated | Rate of air added for 4 hrs. cu. ft./hr. hour | Rate of $CO_2$ added for 4 hrs. cu. ft./hour | Viscosity furol Saybolt at 210° F. | Temp. outlet | Discharge flow rate |
|---|---|---|---|---|---|---|
| | Gal. | | | | °F. | Gal./min. |
| Sample treated with air | 5 | 2 | 0 | 1,355 793 | 83-95 | 1 |
| Sample untreated with air | 5 | 0 | 0 | 835 | 83-95 | 1 |
| Sample treated with $CO_2$ | 5 | 0 | 2 | 837 | 83-95 | 1 |

Thus, it was observed that the air added considerably increased the rate of breakdown without being detrimental to the viscosity properties of the blend. Solutions treated with air remained clear and unchanged in color.

The effect of oxygen containing gas or air for aiding the selective breakdown of the polymers was extensively studied, and the reproducible results showed beyond any doubt that the oxygen containing gas is a useful factor in improving the stability of the polymers. In these tests polymer blends were processed at sufficiently moderate temperatures to preclude any substantial amount of thermal decomposition, e. g., at about 80° F., 100° F., 135° F., and 170° F., with varied amounts of air added and with variations in the rates of flow of the polymer material thru the machine. Representative data obtained in these tests demonstrated how in each instance the thickening action of the polymer was reduced more readily with air added to the oil and polymer blend before the material was forced into the machine.

The test data in the following table are breakdown test results on blends of isobutylene polymer having initially an average molecular weight of about 85,000 blended with a mineral lubricating oil of 47 Saybolt seconds Universal viscosity at 210 F. so that the initial blend had an S. S. U. viscosity of 500 at 100° F.

*Table III*

| Number of treatments | No air added, S. S. U. vis. at 100° F. | Air added, S. S. U. vis. at 100° F. |
|---|---|---|
| 1 | 452 | 408 |
| 2 | 390 | 370 |
| 3 | 370 | 353 |

The polymers may be subjected to the selective size reduction in blends with mineral oils, waxes, asphalts, rubber, and other compatible substances. The addition of oxygen-containing gas to accelerate the selective breakdown of the polymer as it is being subjected to hydraulic shearing and impact stresses in the described machine is preferably employed with polymers of monoolefins or similar polymeric materials which are highly saturated and normally resistant to oxidation. The stabilizing treatment for oil blends with a viscosity less than about 60 S. S. U. at 210° F. is preferably conducted at low or moderately elevated temperatures below about 125° F. For higher viscosity oil blends the stabilizing treatment is preferably conducted at temperatures ranging from ordinary atmospheric temperature to about 200° F. The amount of air to be added for accelerating the selective breakdown may range from about 5% to about 15% by volume of the polymer solution treated.

The present invention is not intended to be limited by any theory nor by examples given for the purposes of illustration nor to any particular polymer compositions, since various modifications are intended to come within the scope of the invention as defined in the appended claims.

We claim:

1. In a process for increasing the stability of linear polymers which are oil-soluble and have the property of improving the viscosity characteristics of a hydrocarbon oil, the improvement which comprises subjecting a mixture of said polymers having different molecular weights to hydraulic shearing and impact stresses exerted upon the polymers in a liquid stream by rotating surfaces against resistance by inertia of the polymers, the liquid stream being given a whirling motion, then being abruptly divided into a multiplicity of streams having a rectilinear motion.

2. The process for increasing the stability of isobutylene polymers having the property of thickening and improving the viscosity characteristics of hydrocarbon lubricating oils which comprises dissolving the polymers in a hydrocarbon oil solvent, admixing a substantial amount of gaseous oxygen with the solution thus formed, and continuously passing said solution through a zone in which the polymers are subjected to hydraulic shearing and impact stresses produced by imparting a rapid whirling turbulent vortical motion to a stream of said solution and then abruptly dividing the stream of solution into a multiplicity of streams having a rectilinear motion.

3. The process for increasing the stability of isobutylene polymers having the property of thickening and lowering the viscosity-temperature coefficient of hydrocarbon lubricating oils, which comprises dissolving the polymers in a hydrocarbon oil solvent, continuously passing said solution at a temperature below about 200° F. through a zone in which the polymers and solution are subjected to hydraulic shearing and impact stresses produced by imparting a rapid whirling turbulent vortical motion to a stream of said solution and then abruptly dividing the stream of solution into a multiplicity of streams having a rectilinear motion.

4. In a process for increasing the stability of thermoplastic linear polymers which are oil-soluble, the improvement which comprises forming an annular liquid stream of the polymers, rapidly rotating said annular stream, impelling the rotating annular stream onward with a whirling motion, abruptly subdividing said whirling annular stream into narrower streams having a rectilinear motion, then merging said narrower streams into a second annular stream having a whirling motion, continuously circulating a portion of said second annular stream to the first mentioned annular stream, and continuously withdrawing a portion of said second annular stream from circulation.

5. In a process for increasing the stability of isobutylene polymers having varied molecular weights above 3000 through selective breakdown of unstable polymers having excessively high molecular weights, the improvement which comprises dissolving the polymers of varied molecular weights into a hydrocarbon lubricating oil, admixing about 5% to about 15% by volume of air with the solution thus formed, continuously passing said solution containing air at a temperature below about 200° F. through a zone in which the polymers are subjected to hydraulic and impact shearing stresses produced by rapidly rotating said solution into a whirling annular stream, abruptly subdividing said whirling annular stream into narrower streams having rectilinear motion, then merging said narrower streams into a second annular stream having a whirling motion, continuously recirculating a portion of said second annular stream to the first mentioned annular stream, and continuously withdrawing a portion of the solution thus treated.

DAVID W. YOUNG.
CHARLES C. SWOOPE.